United States Patent [19]

Inoue et al.

[11] Patent Number: 5,025,277
[45] Date of Patent: Jun. 18, 1991

[54] CAMERA WITH FOCAL POINT SWITCHING MECHANISM

[75] Inventors: Takashi Inoue, Hachioji; Tatsuya Suzuki, Tokyo; Akiteru Kimura, Hachioji; Hiroaki Miyazaki, Tsukui; Moriya Katagiri, Hachioji, all of Japan

[73] Assignee: Olympus Optical Co., Ltd., Tokyo, Japan

[21] Appl. No.: 494,128

[22] Filed: Mar. 15, 1990

[30] Foreign Application Priority Data

Mar. 28, 1989 [JP] Japan .................................. 1-76048

[51] Int. Cl.$^5$ .............................................. G03B 1/18
[52] U.S. Cl. .............................. 354/173.1; 354/195.12
[58] Field of Search ........... 354/173.1, 173.11, 195.12, 354/400–409, 412

[56] References Cited

U.S. PATENT DOCUMENTS

| 4,772,903 | 9/1988 | Labaziewicz ................... 354/195.12 |
| 4,821,059 | 4/1989 | Nakanishi et al. ................ 354/173.1 |
| 4,840,466 | 6/1989 | Yamada et al. ................. 354/195.12 |

FOREIGN PATENT DOCUMENTS 60-80812 5/1985 Japan .
60-97329 5/1985 Japan .

Primary Examiner—L. T. Hix
Assistant Examiner—David M. Gray
Attorney, Agent, or Firm—Frishauf, Holtz, Goodman & Woodward

[57] ABSTRACT

A camera includes a motor, a planet gear mechanism having a planet gear to be revolved or rotated by the motor, a film wind mechanism provided on a revolution orbit of the planet gear and meshed with and driven by the planet gear upon forward rotation of the motor to perform film winding, a film rewind mechanism provided on the revolution orbit of the planet gear and meshed with and driven by the planet gear upon reverse rotation of the motor to perform film rewinding, a focal point switching mechanism provided on the revolution orbit of the planet gear and meshed with and driven by the planet gear upon reverse rotation of the motor to switch a focal length of a photographic lens, and a selecting mechanism for selectively causing the planet gear to mesh with the film rewind mechanism or the focal point switching mechanism upon reverse rotation of the motor.

7 Claims, 11 Drawing Sheets

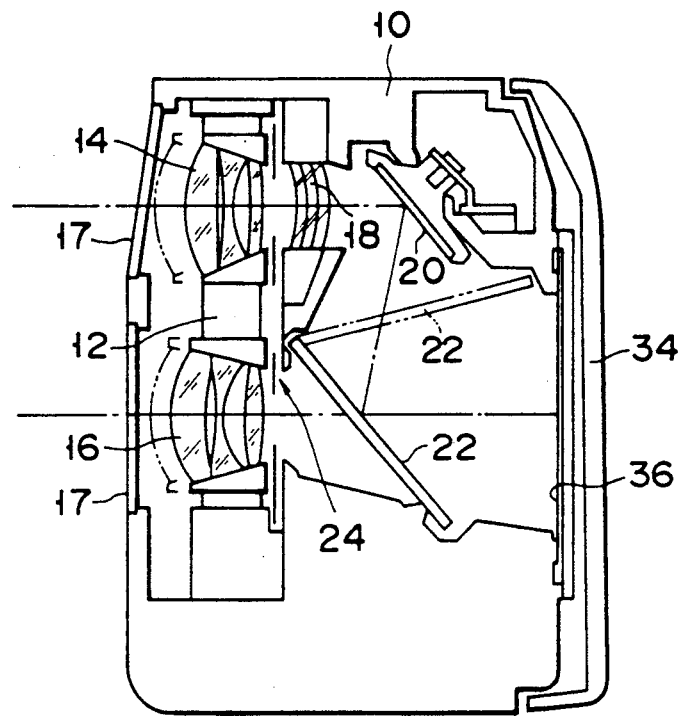
F I G. 3
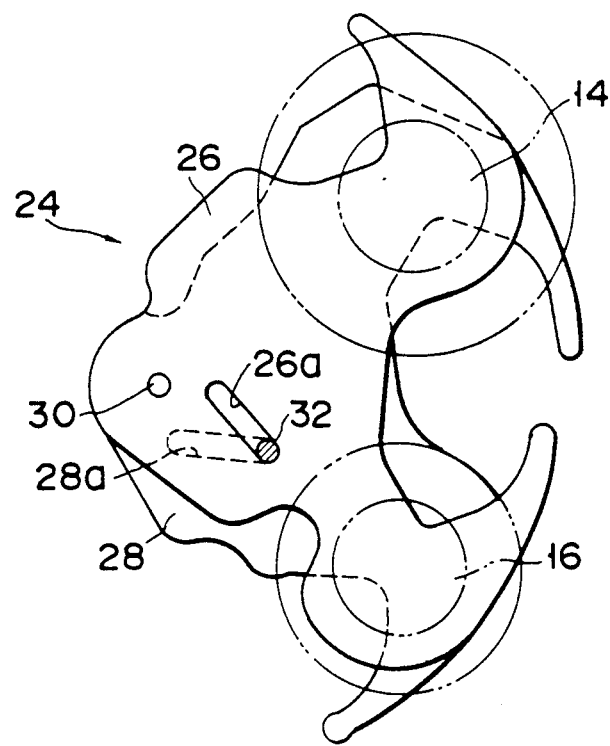
F I G. 4

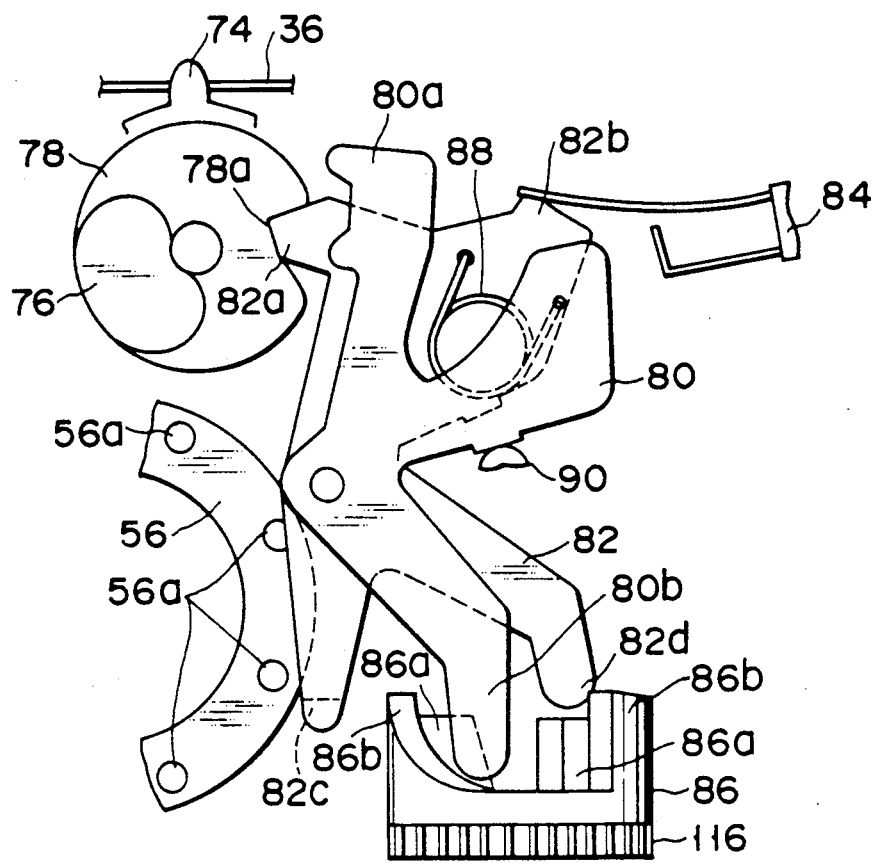
F I G. 9
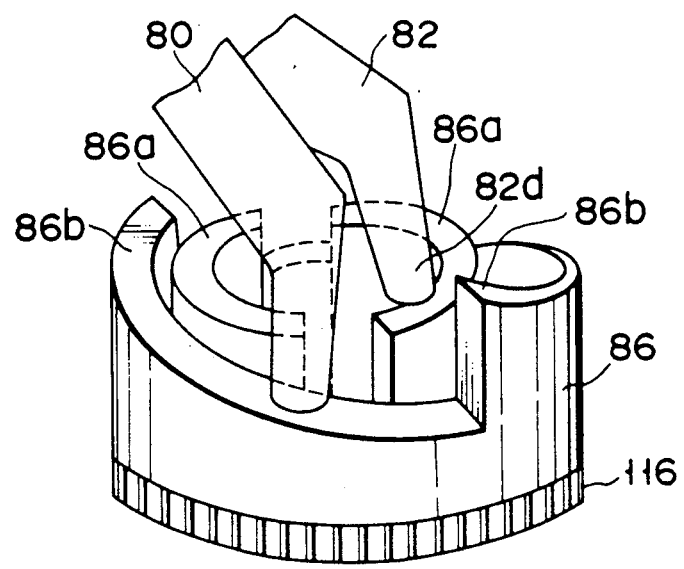
F I G. 10

CAMERA WITH FOCAL POINT SWITCHING MECHANISM

BACKGROUND OF THE INVENTION

1. Field of the Invention

The present invention relates to a camera with a focal point switching mechanism for switching a focal length of a photographic lens.

2. Description of the Related Art

U.S. Pat. No. 4,772,903 discloses a camera with a focal point switching mechanism for selecting one of two photographic optical systems, having different focal lengths, by a pivotal mirror.

Unexamined Published Japanese Patent Application No. 60-80812 discloses a motor-driven variable focal point camera in which switching between two photographic optical systems and focusing control are performed by one motor.

Unexamined Published Japanese Patent Application No. 60-97329 discloses a motor-driven zooming camera in which a zooming mechanism for continuously changing a focal length of one photographic optical system can be driven by a film rewind motor.

Many of these conventional cameras with a focal point switching mechanism belong to a category of a so-called compact camera. A camera of this type must be inexpensive and compact as much as possible to satisfy consumer's needs.

SUMMARY OF THE INVENTION

The present invention has been made in consideration of the above situation and has as its object to provide a camera with a focal point switching mechanism which can perform at least film winding and rewinding and switching between two focal points by one motor regardless of its simpler and more compact arrangement than that of a conventional camera and is therefore less expensive than a conventional camera. In order to achieve the above object of the present invention, there is provided a camera comprising:

(a) a motor;

(b) a planet gear mechanism having a planet gear to be revolved or rotated by the motor;

(c) a film wind mechanism provided on a revolution orbit of the planet gear and meshed with and driven by the planet gear upon forward rotation of the motor to perform film winding;

(d) a film rewind mechanism provided on the revolution orbit of the planet gear and meshed with and driven by the planet gear upon reverse rotation of the motor to perform film rewinding;

(e) a focal point switching mechanism provided on the revolution orbit of the planet gear and meshed with and driven by the planet gear upon reverse rotation of the motor to switch a focal length of a photographic lens; and (f) selecting means for selectively causing the planet gear to mesh with the film rewind mechanism or the focal point switching mechanism upon reverse rotation of the motor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 3 is a schematic longitudinal sectional view showing an optical system of the two-focal-points switching camera according to the embodiment of the present invention;

FIG. 4 is a schematic front view showing a pair of sectors in a closed state driven by the mechanism for performing focusing and exposure control;

FIG. 9 is a schematic plan view showing a sprocket and a sprocket control lever mechanism in the film feed device shown in FIG. 1 in a state before film winding is performed together with a cam used in the mechanism for performing focusing and exposure control shown in FIG. 2 to selectively drive the sprocket control lever mechanism;

FIG. 10 is an enlarged schematic perspective view showing an operation portion of the sprocket control lever mechanism with respect to the cam shown in FIG. 9;

An embodiment of the present invention will be described in detail below with reference to the accompanying drawings.

DETAILED DESCRIPTION OF THE PREFERRED EMBODIMENT

Figures 5A, 5B:
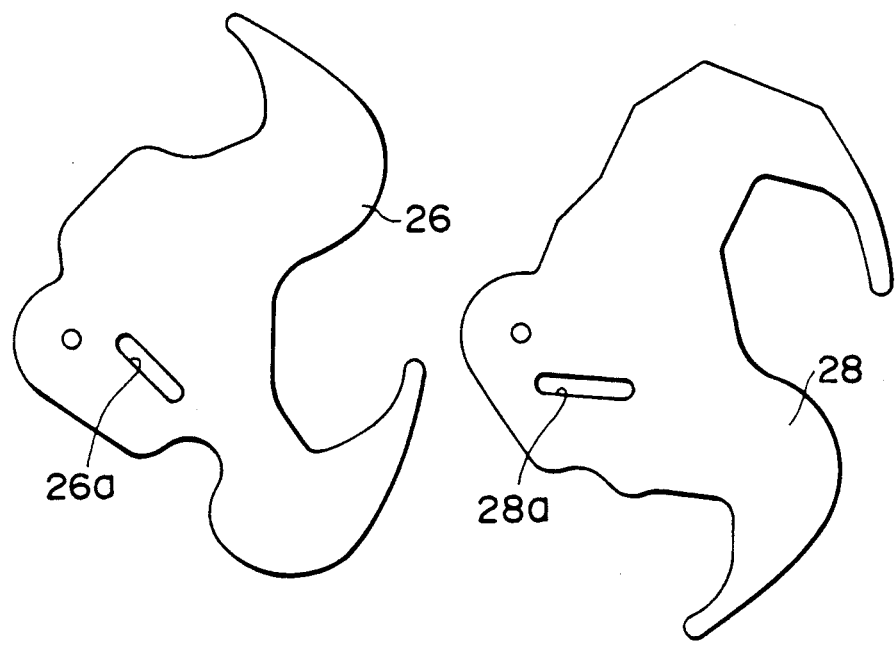
FIGS. 5A and 5B are schematic front views showing individual sectors of the pair of sectors shown in FIG. 4, respectively.

FIG. 3 is a schematic longitudinal sectional view showing an optical system of a two-focal-points switching camera according to an embodiment of the present invention. In this camera, a lens support frame 12 movably provided at substantially the center of a front portion of a housing 10 supports first telephoto lens group 14 and wide-angle lens group 16 by its upper and lower portions, respectively. Referring to FIG. 3, a forward position of the frame 12 is indicated by a two-dot chain line, and its backward position is indicated by a solid line. Regions of the front surface of the housing 10 opposing the first telephoto lens group 14 and the wide-angle lens group 16 on the lens support frame 12 are opened and covered with transparent windows 17. Second telephoto lens group 18 and a first reflecting mirror 20, both of which are fixed to the housing 10, are arranged behind the first telephoto lens group 14 of the frame 12 in the housing 10. A second reflecting mirror 22 for switching an optical path is arranged behind the wide-angle lens group 16 on the frame 12 in the housing 10, and an upper end of the second mirror 22 is pivotally mounted on the housing 10. A sector mechanism 24 for commonly acting on the first telephoto lens group 14 and the wide-angle lens group 16 on the frame 12 is arranged between the rear end of the frame 12 and both of the second telephoto lens group 18 fixed to the housing 10 and the second reflecting mirror 22 pivotally mounted on the housing 10. FIG. 4 schematically shows a pair of sectors 26 and 28 of the sector mechanism 24, which is located at their closed position. FIGS. 5A and 5B show the shapes of the sectors 26 and 28, respectively. The paired sectors 26 and 28 are pivotally attached on a common rotational center shaft 30 fixed to the housing 10. Elongated guide holes 26a and 28a are formed in the sectors 26 and 28, respectively, so as to cross each other. When a sector drive pin 32 on a sector drive control lever (to be described later) is inserted in a cross region between the holes 26a and 28a and moves in the holes 26a and 28a, the paired sectors 26 and 28 move between a closed position shown in FIG. 4 and an open position shown in FIG. 6.

When the paired sectors 26 and 28 of the sector mechanism 24 are opened while the second reflecting mirror 22 is located in a lower position as indicated by a solid line in FIG. 3, incident light from the wide-lens group 16 into the housing 10 of the camera is shielded by the rear surface of the second mirror 22 and therefore cannot reach a film 36 stored in the housing 10 to extend along a rear cover 34 of the housing 10. Meanwhile, incident light from the first telephoto lens group 14 into the housing 10 of the camera is passed through the second telephoto lens group 18 and reflected by the first reflecting mirror 20 toward the second reflecting mirror 22. The mirror 22 allows the light from the first lens group 14 to reach the film 36. That is, when the second reflecting mirror 22 is located in the lower position as shown in FIG. 3, the two-focal-points switching camera according to the embodiment of the present invention functions as a camera with a telephoto lens.

When the paired sectors 26 and 28 of the sector mechanism 24 are opened while the second reflecting mirror 22 is located in an upper position as indicated by a two-dot chain line in FIG. 3, incident light from the first telephoto lens group 14 into the housing 10 of the camera are reflected by the second mirror 22 pivoted to the upper position and therefore do not reach the film 36. Incident light from the wide-angle lens group 16 into the housing 10, however, can reach the film 36 without being shielded by the second mirror 22. That is, when the second reflecting mirror 22 is located in the upper position as indicated by the two-dot chain line in FIG. 3, the two-focal-points switching camera according to the embodiment of the present invention functions as a camera with a wide-angle lens.

Regardless of whether the two-focal-points switching camera of this embodiment functions as a camera with a telephoto lens or a wide-angle lens, focusing is performed by moving the lens support frame 12 forward-/backward in the housing 10 by the focusing mechanism driven by a motor as will be described later.

Figure 1:
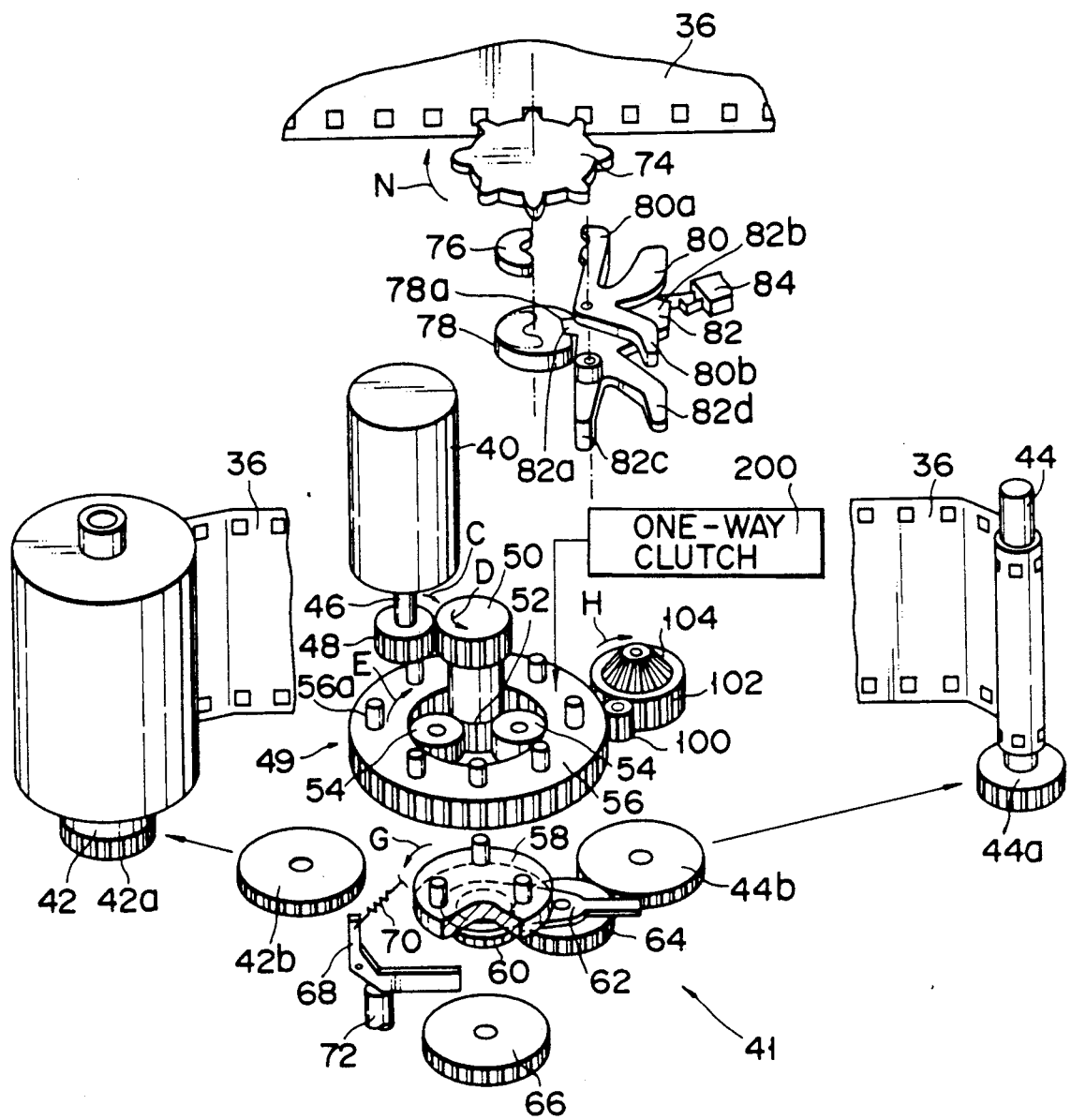
FIG. 1 is a schematic perspective view showing a main part including a planet gear mechanism of a film feed device for winding and rewinding a film by using one motor in a two-focal-points switching camera according to an embodiment of the present invention.

FIG. 1 schematically shows a film feed device 41 located in the housing 10 shown in FIG. 3 and driven by a bi-directional motor 40 to perform winding and rewinding of the film 36. In this case, the film feed device 41 performs switching between winding and rewinding of the film by using a planet gear mechanism.

The reversible motor 40 is substantially vertically arranged before the film 36 extending between a patrone shaft 42 and a film wind shaft 44, both of which are arranged at right and left ends in a rear portion of the housing 10 of the camera, along the rear cover of the housing. A small driving gear 48 fixed to an output shaft 46 extending downward from the motor 40 meshes with an input gear 50 of a first differential gear mechanism 49 having a substantially vertical rotational center axis. The input gear 50 is rotatably supported by the housing of the camera, and a sun gear 52 of the first differential gear mechanism 49 is concentrically and integrally formed with the input gear 50 so as to be located under the gear 50. Three planet gears 54 having the same size and arranged at equal intervals along the circumference of the sun gear 52 mesh with the gear 52, and internal gear teeth of a first annular output gear 56 mesh with the three planet gears 54. The planet gears 54 are rotatably supported on a planet gear support disk 58 arranged below the sun gear 52 so as to be concentrical with and independent of the gear 52.

The disk 58 is rotatably supported by the housing, and a second output gear 60 is concentrically and integrally formed with the lower surface of the disk 58. One end portion of a rocking lever 62 is connected to the lower surface of the disk 58 so as to horizontally rotate about a rotational center axis of the output gear 60, and a planet gear 64 meshed with the output gear 60 is rotatably supported by the lever 62. When the lever 62 rocks about the rotational center axis of the output gear 60, the planet gear 64 meshes with the output gear 60 and revolves around the rotational center axis of the output gear 60 while rotating on its axis. At this time, in a revolution orbit of the planet gear 64, a rewind input gear 42b of a film rewind gear train continuous with a film rewind gear 42a fixed at the lower end of the patrone shaft 42, and a wind input gear 44b of a film wind gear train continuous to a film wind gear 44a fixed at the lower end of the film wind shaft 44 are arranged to be separated from each other in a common horizontal plane. In the same horizontal plane as the second output gear 60 and near the second output gear 60, a telephoto range/wide-angle range switching gear 66 of the two-focal-points switching mechanism is rotatably supported in the housing so as to have a substantially vertical rotational center axis. The gear 66 is in contact with a circumscribed circle drawn by the revolution orbit of the planet hear 64 between the rewind input gear 42b and the wind input gear 44b.

A substantially L-shaped stopper lever 68 is located between the rewind input gear 42b and the telephoto range/wide-angle range switching gear 66. The lever 68 is attached at its cross region between its upwardly and horizontally extending portions on a horizontal rotational center shaft fixed to the housing, so that the lever 68 can pivot in a vertical plane about the horizontal shaft. The stopper lever 68 is biased by a biasing means 70 so that the horizontally extending portion inclines downward. Since the lower edge of the horizontally extending portion abuts against the stopper 72, an extending end of the horizontally extending portion of the stopper lever 68 is located in a locus of the free end of the rocking lever 62 between the input gear 42b and the telephoto range/wide-angle range switching gear 66.

A return cam 76 and a locking cam 78 are integrally and sequentially formed on the lower surface of a sprocket 74, having a substantially vertical rotational center axis, in the direction of the rotational center axis. The return cam 76 is eccentrically arranged with the rotational center axis, and the locking cam 78 has a unidirectional locking recess portion 78a in its outer circumferential surface.

A charge lever 80 and a locking lever 82 commonly having a substantially vertical rotational center axis are arranged near the return and locking cams 76 and 78 in substantially the same horizontal plane as these cams.

Each end portion of the locking lever 82 is branched into two portions. As is clearly shown especially in FIG. 9, one branched arm at one end portion of the lever 82 has an engaging projection 82a engaged with the unidirectional locking recess portion 78a of the locking cam 78, and the other branched arm thereof has a switch press projection 82b for pressing and turning off a one-frame switch 84. One branched arm of the other end portion of the lever 82 extends close to the upper surface of the first annular output gear 56 in the first differential gear mechanism 49 and has an engaging projection 82c projecting downward. The engaging projection 82c is separated from the locus of locking pins 56a concentrically fixed at equal intervals on the upper surface of the first output gear 56. As is especially clearly shown in FIG. 9, the other branched arm of the other end portion of the lever 82 constitutes a timing cam follower 82d which is in contact with the cam surface of the upper end of a timing cam 86a of a locking lever control cam member 86 having a rotational center axis substantially perpendicular with respect to the front wall of the housing of the camera.

As is especially clearly shown in FIG. 10, the cam surface of the upper end of the timing cam 86a of the locking lever control cam member 86 is constituted by a flat surface included in a plane substantially perpendicular to the rotational center axis of the member 86 and is divided into two portions by gaps formed every 180°.

The charge lever 80 has a deformed Y shape. One branched arm of one end portion branched into two portions has a return cam contact portion 80a which is separated from the rotational locus of the return cam 76. As is especially clearly shown in FIG. 9, a toggle spring 88 is hooked at its both ends the other branched arm of the one end portion of the charge lever 80 and the switch press projection 82b of the locking lever 82. Referring to FIG. 9, the toggle spring 88 biases the locking lever 82 in the counterclockwise direction and biases the charge lever 80 in the clockwise direction. As shown in FIG. 9, rotation of the charge lever 80 in the clockwise direction caused by a biasing force of the toggle spring 88 is stopped since the other branched arm at the one end portion of the lever 80 abuts against a stopper 90, and rotation of the locking lever 82 is stopped since the engaging projection 82a is seated in the unidirectional locking recess portion 78a of the locking cam 78.

As is especially clearly shown in FIG. 9, the other end portion of the charge lever 80 constituted by one arm constitutes a starting cam contact portion 80b which is in contact with the cam surface of the upper end of a starting cam 86b formed in the locking lever control cam member 86 so as to be concentrically located with the timing cam 86a at the outside thereof.

As is especially clearly shown in FIG. 10, the cam surface of the upper end of the starting cam 86b of the locking lever control cam member 86 is constituted by two surfaces inclined at the same angle with respect to a plane substantially perpendicular to the rotational center axis of the member 86. The starting cam contact portion 80b at the other end portion of the charge lever 80 is located in one bottom portion of the two cam surfaces of the starting cam 86b.

A mechanism coupling gear 102 meshes with the outer gear teeth formed on the outer circumferential surface of the first annular output gear 56 in the first differential gear mechanism 49 shown in FIG. 1 via an idler gear 100. An output bevel gear 104 is concentrically formed on the upper surface of the coupling gear 102 to transmit a rotational driving force of the bidirectional motor 40 from the first differential gear mechanism 49 to a focusing/exposure control mechanism (to be described later). An input bevel gear 110 concentrically and integrally formed with a sun gear 108 in a second differential gear mechanism 106 of the focusing/exposure control mechanism shown in FIG. 2 meshes with the output bevel gear 104. A common rotational center shaft 112 of the input bevel gear 110 and the sun gear 108 is rotatably supported by the front wall of the housing of the camera (not shown in FIG. 2) so as to be substantially perpendicular to the front wall.

Figure 2:
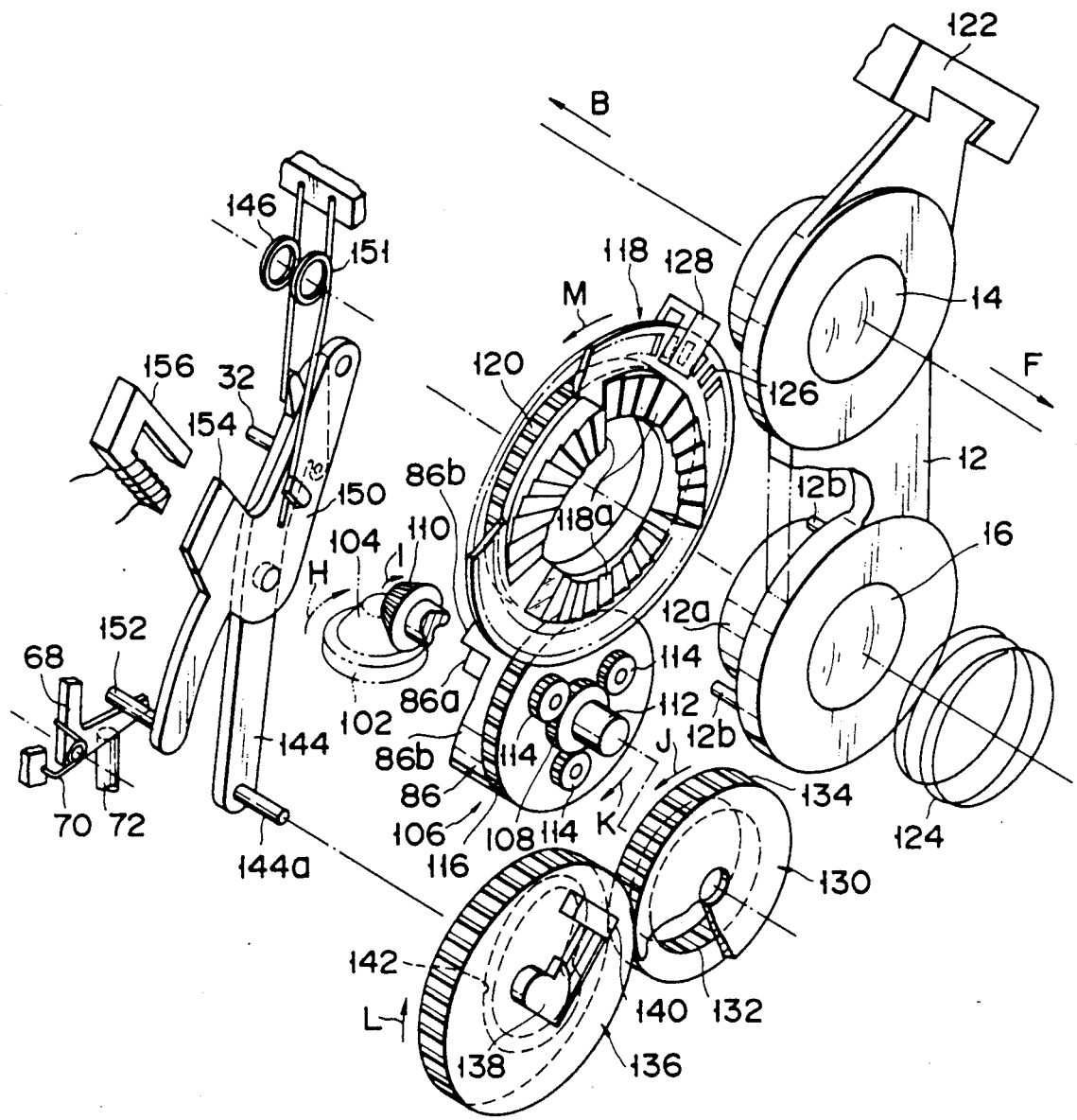
FIG. 2 is a schematic perspective view showing a mechanism connected to the planet gear mechanism in the film feed device shown in FIG. 1 to perform focusing and exposure control by a rotational force from the motor in the two-focal-points switching camera according to the embodiment of the present invention.

Referring to FIG. 2, a right downward direction indicated by an arrow F indicates a front surface side of the camera, and a left upward direction indicated by an arrow B indicates a rear surface side of the camera.

Three planet gears 114 having the same size and arranged at equal intervals along the circumferential direction of the sun gear 108 in the second differential gear mechanism 106 mesh with the gear 108, and are rotatably supported on the bottom surface of the above described locking lever control cam member 86 (FIGS. 9 and 10) concentrically and rotatably attached on a rotational center shaft 112 of the sun gear 108. The cam surfaces of the timing cam 86a and the starting cam 86b of the locking lever control cam member 86 on the rotational center shaft 112 face the rear surface side (i.e., the film surface side) of the housing of the camera. As shown in FIGS. 9 and 10, the starting cam contact portion 80b of the charge lever 80 and the timing cam follower 82d of the locking lever 82 are brought into slidable contact with these cam surfaces.

A focusing output gear 116 is formed on the outer circumferential surface of the locking lever control cam member 86 in a region close to its bottom surface. A focusing input gear 120 of an annular focusing cam member 118 arranged behind the wide-range lens group 16 supported by the lens support frame 12 to be concentrical with the lens group 16 meshes with the focusing output gear 116.

The focusing cam member 118 is rotatably supported on the housing 10 so as to be concentric with the wide-range lens group 16 at the rear surface side of the camera. The outer circumferential surface of a wide-range lens group support cylinder 12a of the frame 12 projecting toward the rear surface side of the camera is guided by the housing 10. When the frame 12 is guided by a guide member 122 of the housing of the camera to move forward/backward with respect to the camera, it is moved forward/backward with respect to the focusing cam member 118.

Three focusing cams 118a having the same size are concentrically formed at equal intervals along the circumferential direction on the front surface of the member 118 opposing the lens support frame 12. A cam surface formed on the end of each of the cams 118a is constituted by a predetermined number of steps having the same size. Projecting ends of three lens support frame drive pins 12b formed outside the outer circumferential surface of the wide-range lens group support cylinder 12a, concentrically with the cylinder 12a and at equal intervals along the circumferential direction on the rear surface (located at the rear surface side of the camera) of the frame 12 are in contact with regions on the front surface of the focusing cam member 118 between the focusing cams 118a. A compression coil spring 124 is sandwiched between the front surface (at the front wall side of the camera) of the frame 12 and the inner surface of the front wall (not shown) of the housing of the camera so as to be concentrical with the wide-range lens group 16, and the lens support frame 12 brings the projecting ends of the pins 12b into contact with the three regions on the front surface of the member 118 between the cams 118a by a biasing force of the spring 124.

A predetermined large number of through holes 126 are formed at equal intervals in the circumferential direction in the focusing cam member 118 at a position radially outside and concentrical with the three focusing cams 118a. The through holes 126 of the member 118 are used in combination with a photointerrupter 128 to detect a rotational angle of the member 118. The holes 126 are also used to detect a forward movement amount of the lens support frame 12 which brings the three lens support frame drive pins 12b into contact with the cam surfaces of the three focusing cams 118a upon rotation of the focusing cam member 118.

Inner gear teeth 132 of a shutter drive output gear 130 concentrically and rotatably mounted on the rotational center shaft 112 of the sun gear 108 mesh with the three planet gears 114 of the second differential gear mechanism 106. A control gear 136 supported by the front wall (not shown) of the housing of the camera so as to be rotatable about a rotational center axis substantially perpendicular to the front wall meshes with outer gear teeth 134 formed on the outer circumferential surface of the shutter drive output gear 130.

Figures 11, 12:
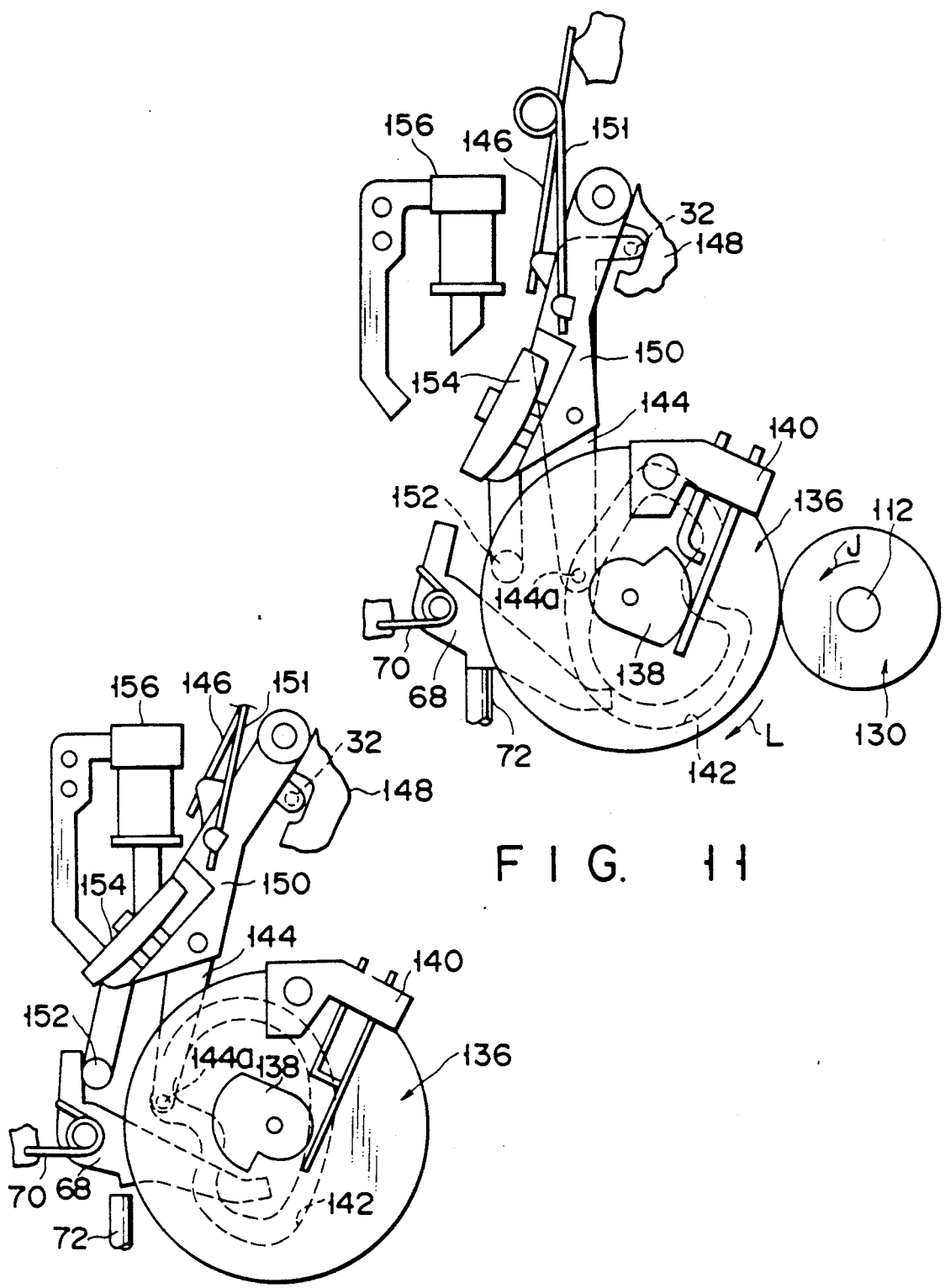
FIG. 11 is a schematic front view showing a control gear shown in FIG. 2 and a sector drive lever mechanism controlled by the control gear to drive opening/closing for exposure of the pair of sectors, both in a state before taking photograph for one frame of a film is started.
FIG. 12 is a schematic front view showing a state of the control gear and the sector drive lever mechanism shown in FIG. 11 immediately after taking photograph for one frame of a film is started and while an automatic focusing mechanism operates.

An exposure start timing detection cam member 138 is fixed on the front surface of the control gear 136, and the cam member 138 presses and turns off an exposure start timing switch 140 fixed on the inner surface of the front wall of the housing of the camera, as especially clearly shown in FIG. 11.

A cam groove 142 having a predetermined shape is formed in the rear surface of the control gear 136. A cam follower pin 144a, planted at one end of a sector drive control lever 144 which has the above described sector drive pin 32 at its other end, is inserted in the cam groove 142. The other end of the lever 144 is biased by a biasing means 146 supported by the inner surface of the front wall of the housing of the camera (not shown) so that the lever 144 rotates in the clockwise direction about the cam follower pin 144a. This rotation of the lever 144 is stopped since the other end of the lever 144 abuts against a stopper 148 formed on the inner surface of the front wall of the housing of the camera (not shown), as especially clearly shown in FIG. 11.

A central portion of a sector drive control lever 144 is rotatably supported at the tip end portion of a magnet lever 150, and the rotatably supported portion of the lever 144 can revolute around an axis of the base end of the magnet lever 150. The magnet lever 150 is biased by biasing means 151 in the direction in which the lever 144 is biased. The tip end portion of the magnet lever 150 extends close to the stopper lever 68 for the rocking lever 62 of the planet gear 64 in the first differential gear mechanism 49. A stopper lever drive pin 152 horizontally extending in a position substantially opposing both the upward extending arm portion and sideward extending arm portion of the stopper lever 68 is fixed to the above described tip end of the magnet lever 150.

A magnet receiving plate 154 is formed on the upper edge of a central portion of the magnet lever 150, and an electromagnet 156 fixed to the housing (not shown) of the camera is arranged obliquely above the plate 154.

Figure 7:
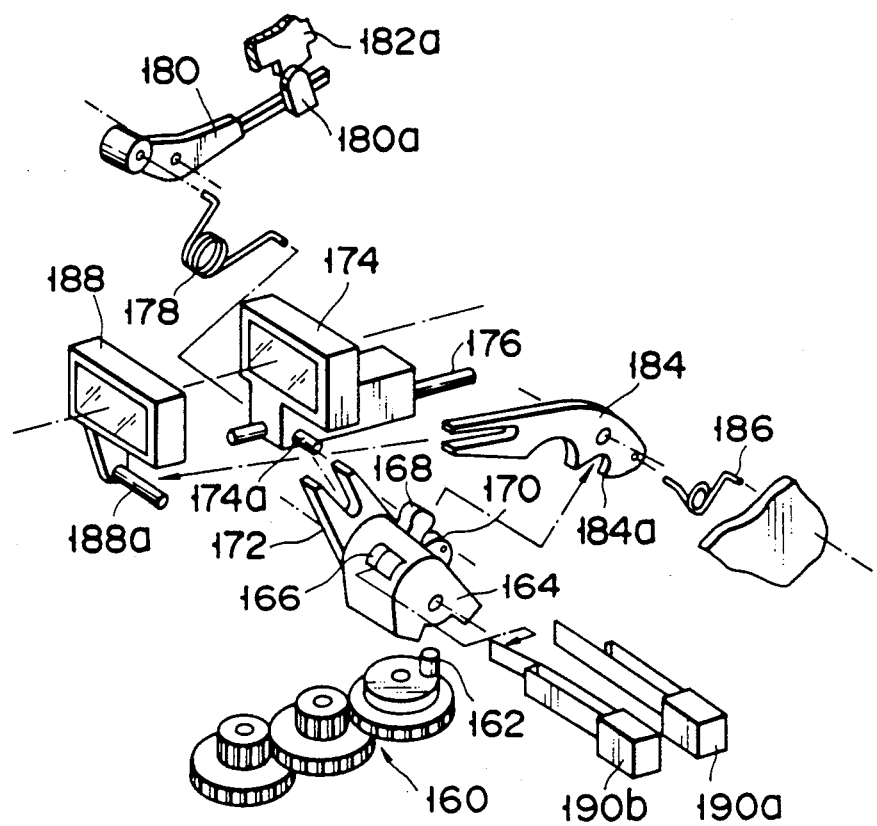
FIG. 7 is a schematic exploded perspective view showing a state in which a two-focal-points switching mechanism provided on a revolution orbit of the planet gear of the planet gear mechanism of the film feed device shown in FIG. 1 to switch between two focal points by rotation of an output shaft of the motor in a direction opposite to a rotation direction of the output shaft of the motor upon film winding is arranged in a focal point set position for a wide-angle range.

FIG. 7 schematically shows a telephoto range/wide-angle range switching mechanism driven by the telephoto range/wide-angle range switching gear 66 arranged on a circumscribed circle of the locus of the planet gear 64 supported by the rocking lever 62 in the first differential gear mechanism 49 shown in FIG. 1. The telephoto range/wide-angle range switching mechanism has an input gear train 160 meshed with the gear 66, and a cam drive pin 162 projecting upward is eccentrically fixed on the upper surface of the last gear in the gear train 160. The pin 162 projects into a central recess portion of a saddle-like telephoto range/wideangle range switching cam member 164 having a rotational center axis extending substantially horizontally to be substantially parallel to the inner surface of the front wall (not shown) of the housing of the camera.

A telephoto range/wide-angle range detection switch press projection 166, a first finder lens drive projection 168, a second reflecting mirror drive projection 170 and a forked second finder lens drive projection 172 are formed on the outer circumferential surface of the telephoto range/wide-angle range switching cam member 164.

A horizontal engaging pin 174a of a second finder lens support frame 174 is inserted between the distal end portions of a pair of arms of the second finder lens drive projection 172, and the frame 174 can move in the back and forth direction of the camera on a guide rod 176 extending substantially perpendicular to the front wall (not shown) of the housing of the camera. As shown in FIG. 7, when the second finder lens drive projection 172 is inclined toward the front side of the camera, the second finder lens support frame 174 is located at the front end portion of the guide rod 176.

A second reflecting mirror drive arm 180 is coupled to the second reflecting mirror drive projection 170 via a biasing means 178, and is fixed to the rotational center shaft of the second reflecting mirror 22 shown in FIG. 3 so as to rotate together with the mirror 22. As shown in FIG. 7, when the telephoto range/wide-angle range switching cam member 164 is located in a position in which the second finder lens drive projection 172 is inclined toward the front side of the camera, the second finder lens support frame 174 abuts against the front stopper (not shown) of the housing of the camera via the member 164. At the same time, the second reflecting mirror drive arm 180 is arranged in an upper position, at which its stopper 180a abuts against an upper stopper receiver 182a of the housing (not shown) by the biasing means 178. In this case, the second reflecting mirror 22 shown in FIG. 3 is also arranged in an upper position, i.e., a wide-angle range photography position indicated by the two-dot chain line in FIG. 3.

An engaging recess portion 184a on the lower edge of a vertical rocking member 184 having a rotational center axis extending substantially horizontally to be substantially parallel to the front wall (not shown) of the housing of the camera is engaged with the first finder lens drive projection 168 of the telephoto range/wideangle range switching cam member 164. Both ends of a biasing means 186 are hooked on the rear end portion of the member 184 and the housing of the camera. The front end portion of the member 184 branches into upper and lower arms, and a horizontal engaging pin 188a of a first finder lens support frame 188 is inserted between the branched paired arms of the front end portion. The frame 188 can move vertically with respect to the camera (not shown) on a guide member (not shown) extending substantially vertically to be substantially parallel to the front wall (not shown) of the housing of the camera. As shown in FIG. 7, when the telephoto range/wide-angle range switching cam member 164 is located in a position in which the second finder lens drive projection 172 is inclined toward the front side of the camera, the vertical rocking member 184 is moved upward by the biasing means 186. Therefore, the first finder lens support frame 188 abuts against the upper stopper of the camera housing (not shown) before the second finder lens support frame 17 located at its front end portion, so that the first finder lens of the first finder lens support frame 188 are coaxially with the second finder lens of the second finder lens support frame 174. As shown in FIG. 7, the second finder lens of the second finder lens support frame 174 located at the front side and the first finder lens of the first finder lens support frame 188 arranged coaxially with the second finder lens constitute a wideangle range photographic finder.

In the locus of the telephoto range/wide-angle range detection switch press projection 166 when the telephoto range/wide-angle range switching cam member 164 rotates, a telephoto range detection switch 190a and a wide-angle range detection switch 190b are arranged in the back and forth direction of the housing (not shown) of the camera so as to be separated from each other. As shown in FIG. 7, when the telephoto range/wide-angle range switching cam member 164 is located in a position in which the second finder lens drive projection 172 is inclined forward, the telephoto range/wide-angle range detection switch press projection 166 presses and turns on the wide-angle range detection switch 190b located in front of the projection 166.

Figure 8:
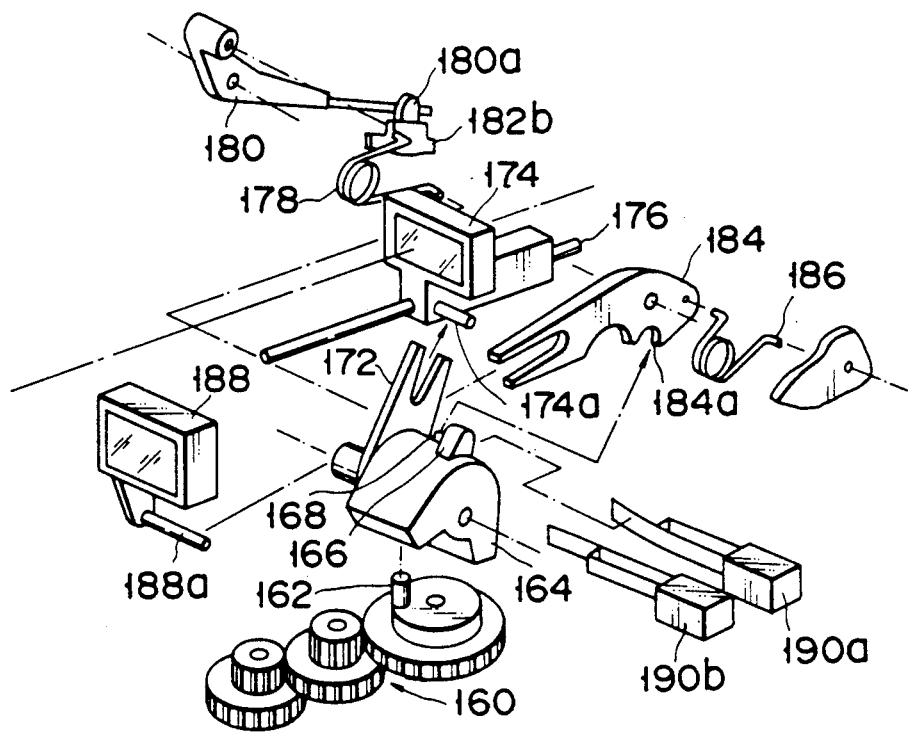
FIG. 8 is a schematic exploded perspective view showing a state in which the two-focal-points switching mechanism shown in FIG. 7 is arranged in a focal point set position for a telephoto range.

In the telephoto range/wide-angle range switching mechanism shown in FIG. 7, when a rotational force is input from the bi-directional motor 40 shown in FIG. 1 to the input gear train 160 and the eccentric cam drive pin 162 on the upper surface of the last gear in the input gear train 160 moves from the position shown in FIG. 7 to the position circumferentially separated by substantially 180° as shown in FIG. 8, the telephoto range/wide-angle range switching cam member 164 is located in a position in which the second finder lens drive projection 172 is inclined backward The second finder lens support frame 174 is moved to the rear end of the guide rod 176 by the second finder lens drive projection 172 as shown in FIG. 8. The second reflecting mirror drive arm 180 is moved to the lower position, at which its stopper 180a abuts against a lower stopper receiver 182b formed as a counterpart of the upper stopper receiver 182a in the housing (not shown) of the camera, by the second reflecting mirror drive projection 170 on the telephoto range/wide-angle range switching cam member 164 via the biasing means 178. At this time, the second reflecting mirror 22 shown in FIG. 3 is moved to the lower position, i.e., the telephoto range photograph position indicated by the solid line in FIG. 3.

The first finder lens support frame 188 is moved to a position separated downward from the optical axis of the second finder lens on the second finder lens support frame 174 by the first finder lens drive projection 168 member 164 via the vertical rocking member 184 moved to the lower end position as shown in FIG. 8. As shown in FIG. 8, the second finder lens on the second finder lens support frame 174 arranged at the rear end portion of the guide rod 176 and not combined with the first finder lend on the first finder lens support frame 188 constitute a telephoto range photographic finder.

The telephoto range/wide-angle range detection switch press projection 166 on the telephoto range/-wideangle range switching cam member 164 moves away from the wide-angle detection switch 190b located in front of it and presses and turns on the telephoto range detection switch 190a located behind it.

FIGS. 1, 2, 4, 7 or 8, 9 and 10 cited in the above detailed description show a mutual relative positional relationship between the various constituting members in the two-focal-positions switching camera, according to the embodiment of the present invention in a state, before a film is loaded in a predetermined position in the camera and one frame of the film is photographed.

Operations of the above various constituting members in the two-focal-positions switching camera, according to the embodiment of the present invention, from a time at which a shutter button (not shown) is depressed in order to photograph one frame of a film to a time at which the photographed frame of the film is wound and preparation for the next frame is finished will be described below.

When the shutter button (not shown) is depressed, the bi-directional motor 40 shown in FIG. 1 rotates the output shaft 46 in the clockwise direction as indicated by an arrow C in FIG. 1 at a predetermined speed. This rotation rotates the input gear 50 and the sun gear 52 of the first differential gear mechanism 49 in the counter-clockwise direction as indicated by an arrow D in FIG. 1. The sun gear 52 biases the annular first output gear 56 to rotate in the clockwise direction as indicated by an arrow E in FIG. 1 and biases the planet gear support disk 58 supporting the three planet gears 54 to rotate in the counterclockwise direction as indicated by an arrow G in FIG. 1. Since the engaging projection 82a of the locking lever 82 engages with the unidirectional locking recess portion 78a of the locking cam 78 integrally formed with the sprocket 74 as shown in FIGS. 1 and 9 to stop the movement of the film 36 in the film wind direction, the planet gear support disk 58 cannot rotate in the counterclockwise direction as indicated by the arrow G in FIG. 1 for film winding, and only the annular first output gear 56 can rotate in the clockwise direction as indicated by the arrow E in FIG. 1.

This rotation of the first output gear 56 rotates the mechanism coupling gear 102 in the clockwise direction as indicated by an arrow H in FIG. 1 and the mechanism coupling gear 102, in turn, rotates the input bevel gear 110 and the sun gear 108 in the second differential gear mechanism 106 shown in FIG. 2 in the clockwise direction as indicated by an arrow I in FIG. 2. This rotation of the sun gear 108 biases the locking lever control cam member 86 supporting the three planet gears 114 meshed with the sun gear 108 in the clockwise direction as indicated by an arrow K in FIG. 2, and biases the shutter drive output gear 130 meshed with the three planet gears 114 in the counterclockwise direction as indicated by an arrow J in FIG. 2. Since a torque required to rotate the focusing cam member 118 meshed with the focusing output gear 116 of the locking lever control cam member 86 is larger than a torque required to rotate the control gear 136 meshed with the shutter drive output gear 130, the locking lever control cam member 86 does not rotate, and the control gear 136 is rotated in the clockwise direction as indicated by an arrow L in FIG. 2.

When the control gear 136 rotates in the clockwise direction as described above and indicated by the arrow L from its initial position (FIG. 11) in which the shutter button has not been depressed, pressing of the exposure start timing switch 140 performed by the exposure start timing detecting cam member 138 is released to turn on the switch 140, and a switch (not shown) for the electromagnet 156 is turned on.

The clockwise rotation of the control gear 136 from the initial position shown in FIG. 11 causes the cam groove 142 to move the cam follower pin 144a of the sector drive control lever 144 outward in the radial direction of the cam gear 136. As a result, the sector drive control lever 144 rotates in the clockwise direction in FIG. 11 about the upper end portion thereof seated on the stopper 148, and the magnet receiving plate 154 of the magnet lever 150 moving together with the lever 144 is attracted to the electromagnet 156 as shown in FIG. 12.

When the magnet lever 150 is attracted to the electromagnet 156, the cam follower pin 144a of the sector drive control lever 144 abuts against the right-angle bent portion of the cam groove 14 of the control gear 136 to stop rotation of the control gear 136 as shown in FIG. 12.

When the rotation of the control gear 136 is stopped, the locking lever control cam member 86 starts clockwise rotation as indicated by an arrow K in FIG. 2 in place of the cam gear 136. A counterclockwise rotational angle of the focusing cam member 118 as indicated by an arrow M caused by the rotation of the locking lever control cam member 86 is measured by a pulse signal generated by the photointerrupter 128 used in combination with the through holes 126 in the focusing cam member 118.

Figure 13:
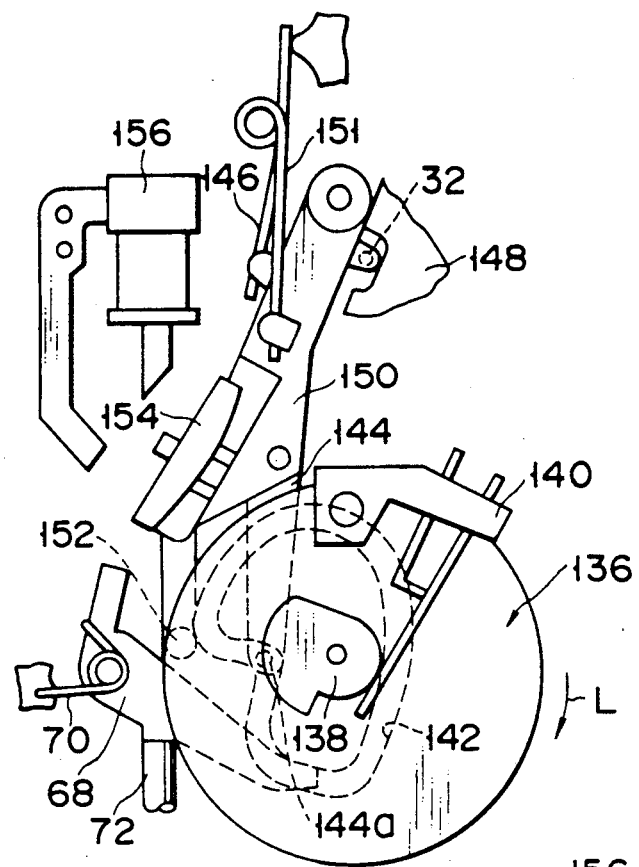
FIG. 13 is a schematic front view showing a state of the control gear and the sector drive lever mechanism shown in FIG. 11 immediately after an operation of the automatic focusing mechanism is finished.

This rotation of the focusing cam member 118 causes the cam surfaces of the focusing cams 118a to push the lens support frame drive pins 12b of the lens support frame 12 in the forward direction, thereby moving the lens support frame 12 in the forward direction in the housing of the camera (not shown). When forward movement of the frame 12, required to obtain a focal point corresponding to a distance to an object to be photographed obtained by a known distance measuring means provided on the front surface of the housing (not shown) of the camera, is finished, supply of a current to the electromagnet 156 is switched off, and the magnet lever 150 and the sector drive control lever 144 are moved by the biasing forces of the respective biasing means 151 and 146, so that the cam follower pin 144a of the lever 144 moves inward in the radial direction of the control gear 136 along the right-angle portion of the cam groove 142, as shown in FIG. 13.

Note that in this embodiment, when the lens support frame 12 is located in the backmost position within the movement range (i.e., when the three lens support frame drive pins 12b of the frame 12 abut against the front surface of the focusing cam member 118 between the cam surfaces of the three focusing cams 118a of the member 118), the distance to an object to be photographed is infinite. As the frame 12 moves forward within the movement range (i.e., as the three lens support frame drive pins 12b of the frame 12 move toward the uppermost portion of the cam surfaces of the three focusing cams 118a on the focusing cam member 118), the distance to an object to be photographed is decreased.

When the cam follower pin 144a of the sector drive control lever 144 passes the right-angle portion of the cam groove 142 as described above, the torque required to rotate the control gear 136 meshed with the sector drive output gear 130 becomes smaller than the torque required to rotate the focusing cam member 118. Therefore, the locking lever control cam member 86 does not rotate, and the control gear 136 restarts clockwise rotation as indicated by the arrow L in FIGS. 2 and 13.

When the rotation of the cam gear 136 is restarted, the current supply to the electromagnet 156 is also restarted. Therefore, the cam follower pin 144a of the sector drive control lever 144 is moved outward in the radial direction of the control gear 136 again by the cam groove 142 upon rotation of the cam gear 136, so that the lever 144 causes the magnet receiving plate 154 of the magnet lever 150 to be attracted to the electromagnet 156 as shown in FIG. 14.

Figure 14:
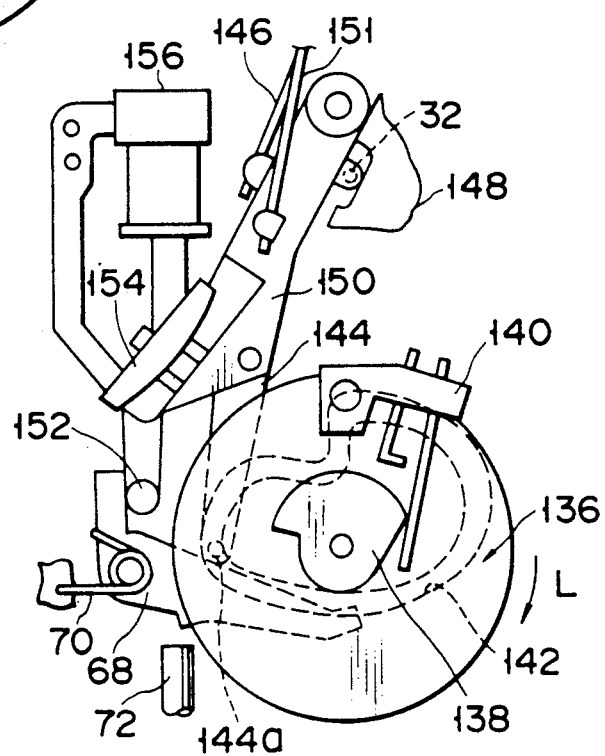
FIG. 14 is a schematic front view showing a state of the control gear and the sector drive lever shown in FIG. 11 after the operation of the automatic focusing mechanism is finished and immediately before automatic exposure is started.

Even after the magnet lever 150 is attracted to the electromagnet 156 as shown in FIG. 14, the control gear 136 is kept rotated in the clockwise direction as indicated by the arrow L in FIG. 14. As a result, the sector drive control lever 144, the cam follower pin 144a of which is moved inward in the radial direction of the control gear 136 by the cam groove 142, rotates in the counterclockwise direction as shown in FIG. 1 about the rotatably coupling portion thereof with respect to the magnet lever 150. At this time, the sector drive pin 32, fixed on the upper end portion of the sector drive control lever 144 separated to the left from the stopper 148, moves a pair of sectors 26 and 28 from a closed position shown in FIG. 4 to a full open position shown in FIG. 6.

Figure 6:
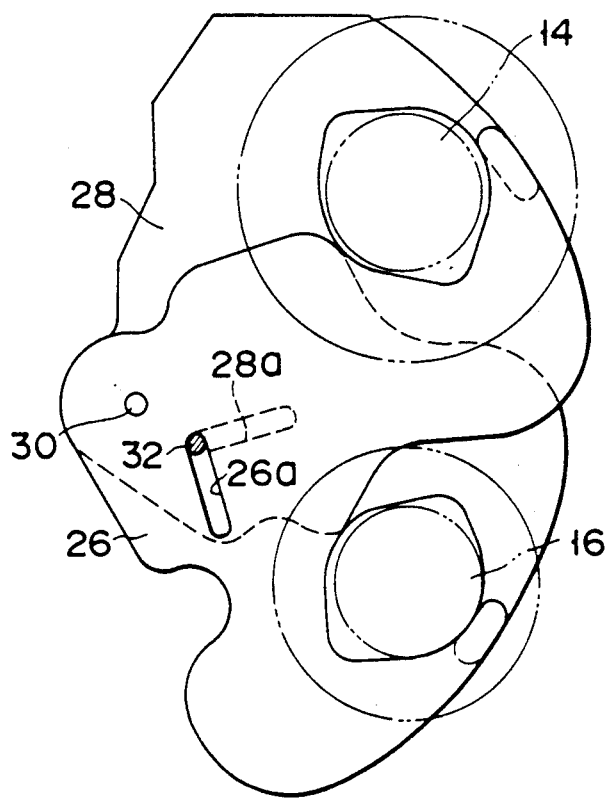
FIG. 6 is a schematic front view showing the pair of sectors shown in FIG. 4 in a full open state.

When the sectors 26 and 28 start movement from the closed position shown in FIG. 4 to the full open position shown in FIG. 6 and start opening, the exposure start timing detection cam member 138 presses and turns off the exposure start timing switch 140. Time measurement is started from this timing, and the current supply to the electromagnet 156 is stopped when a time period for closing the sectors elapses on the basis of photometry data photometered by a photometering element (not shown) provided inside the camera, thereby separating the magnet lever 150 from the electromagnet 156 by the biasing force of the biasing means 151. As a result, the sector drive control lever 144 is also rotated in the clockwise direction from the position shown in FIG. 15 about the rotatably coupling portion with respect to the magnet lever 150 by the biasing force of the biasing means 146, thereby bringing its upper end portion into contact with the stopper 148 again. The sector drive pin 32 fixed on the upper end portion rapidly returns the sectors 26 and 28 to the closed position shown in FIG. 4.

Figure 15:
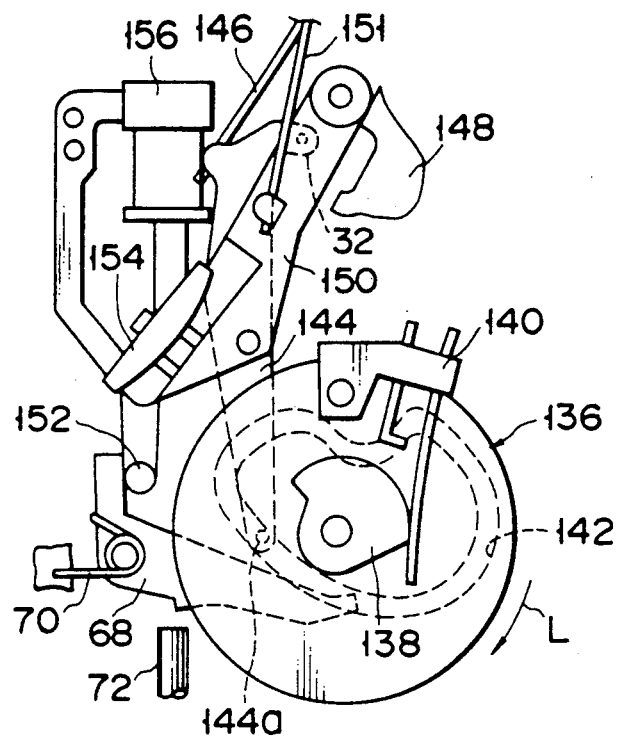
FIG. 15 is a schematic front view showing a state of the control gear and the sector drive lever mechanism shown in FIG. 11 during automatic exposure.
Figure 16:
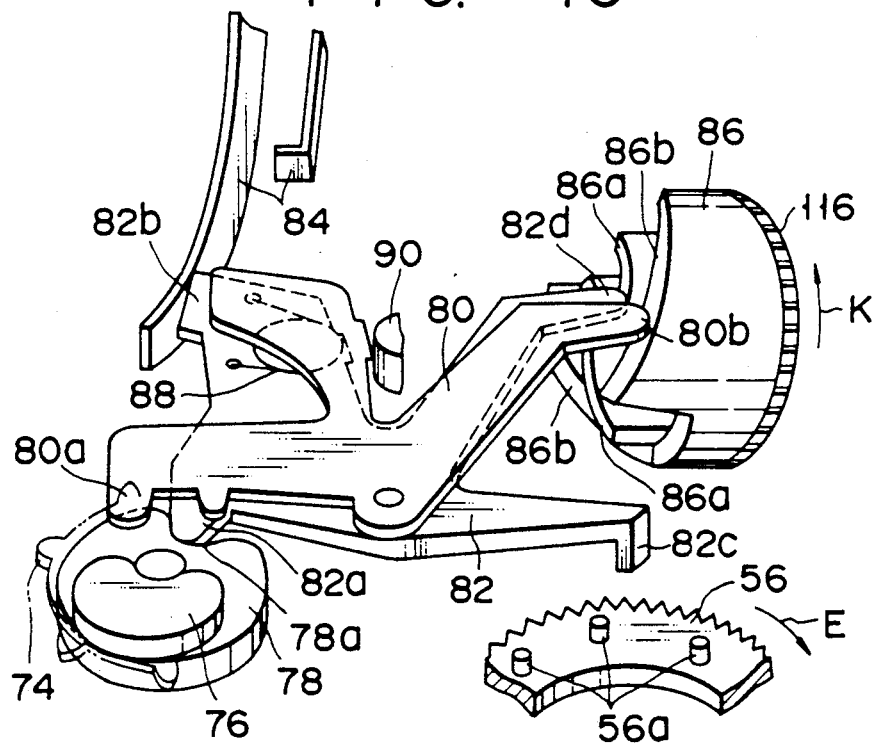
FIG. 16 is a schematic perspective view showing a state immediately after the sprocket, the sprocket control lever mechanism and the cam shown in FIG. 9 start their operations to feed one frame of the film when the operation of the automatic focusing mechanism and the automatic exposure for taking photograph for one frame of the film are finished.

Even after the sectors 26 and 28 are rapidly returned to the closed position shown in FIG. 4, the control gear 136 keeps rotating in the clockwise direction as indicated by the arrow L in FIG. 15 to return to the initial position shown in FIG. 11, thereby finishing the first rotation.

Thereafter, the control gear 136 continues the above rotation to start the second rotation, the state shown in FIG. 12 is reset. At this time, the control gear 136 stops its rotation, and the locking lever control cam member 86 restarts clockwise rotation as indicated by the arrow K in FIG. 2.

The restart of rotation of the member 86 causes the starting cam 86b to press the starting cam contact portion 80b of the charge lever 80. As a result, the charge lever 80 is rotated in a direction to move the return cam contact portion 80a toward the return cam 76.

Figure 17:
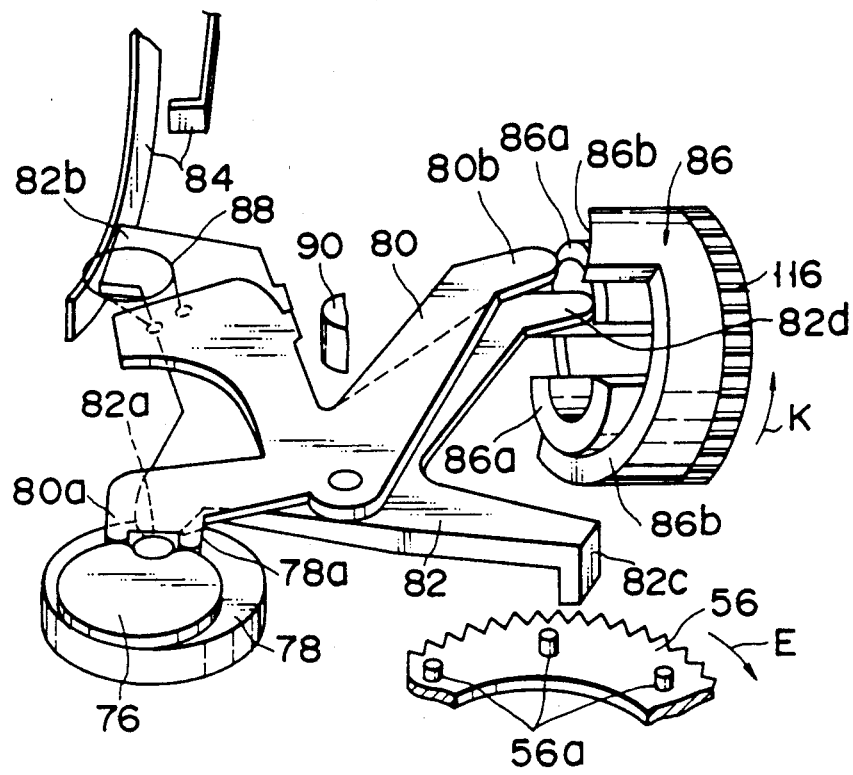
FIG. 17 is a schematic perspective view showing a state of the sprocket, the sprocket control lever mechanism and the cam shown in FIG. 9 immediately before the sprocket shown in FIG. 9 starts its rotation to feed the next frame of the film.

Since the above described rotation of the charge lever 80 reverses the biasing force acting direction of the toggle spring 88 immediately before the charge lever 80 brings the return cam contact portion 80a into contact with the return cam 76, the lever 80 can bring the portion 80a into contact with the cam 76 not by a force of the starting cam 86b of the cam member 86 but by the biasing force of the toggle spring 88 as shown in FIG. 17. The biasing force of the spring 88 also causes the locking lever 82 to separate its engaging projection 82a from the unidirectional locking recess portion 78a of the locking cam 78. The locking lever 82, however, cannot rotate in the above described direction as long as the timing cam follower 82d is in contact with the cam surface of the timing cam 86a of the locking lever control cam member 86.

When the locking lever control cam member 86 keeps clockwise rotation as indicated by the arrow K in FIG. 17 and the timing cam follower 82d of the locking lever 82 separates from the cam surface of the timing cam 86a of the member 86, the locking lever 82 is rotated by the biasing force of the toggle spring 88 in a direction to separate the engaging projection 82a from the unidirectional locking recess portion 78a of the locking cam 78. The rotation of the locking lever 82 in this direction releases pressing of the one-frame switch 84 by the switch press projection 82b, thereby setting an ON state of the one-frame switch 84. In addition, the above described rotation moves the engaging projection 82C into the locus of a plurality of locking pins 56a on the annular first output gear 56 of the first differential gear mechanism 49. The locking lever 82 is kept in this state since it is pressed against the stopper 90 by the biasing force of the toggle spring 88 as shown in FIG. 18.

Figure 18:
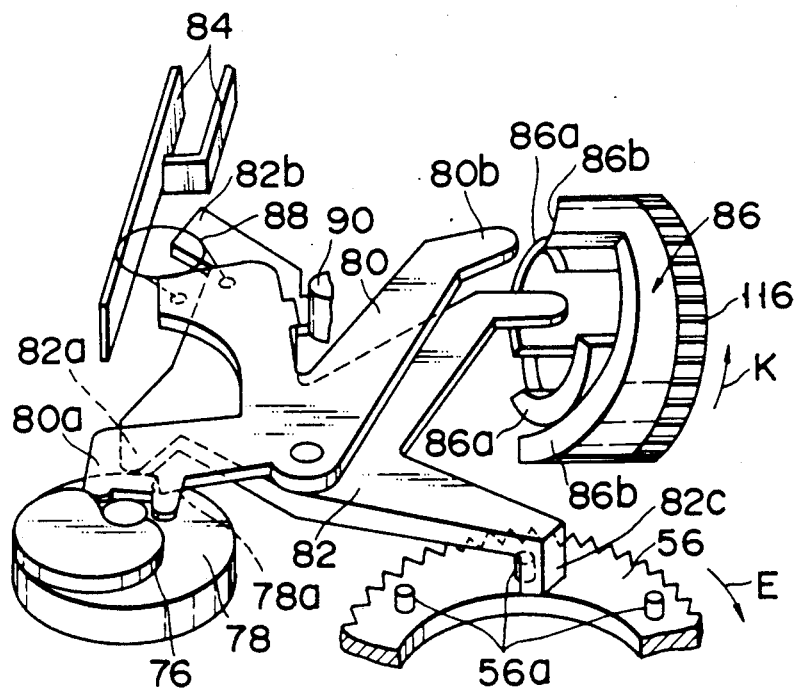
FIG. 18 is a schematic perspective view showing a state of the sprocket, the sprocket control lever mechanism and the cam shown in FIG. 9 immediately after the sprocket shown in FIG. 9 starts its rotation to feed the next frame of the film.

When the engaging projection 82c of the locking lever 82 engages with the locking pins 56a on the annular first output gear 56 of the first differential gear mechanism 49, rotation of the first output gear 56 in the direction indicated by the arrow E in FIGS. 1 and 18 is stopped. As a result, transmission of the rotational force from the bi-directional motor 40 to the locking lever control cam member 86 in the second differential gear mechanism 106 coupled to the first differential gear mechanism 49 is interrupted, and the rotational force from the motor 40 is transmitted to only the planet gear support disk 58 and the second output gear 60 formed integrally with the disk 58 in the first mechanism 49.

At this time, the lowermost portion of the cam surface of the starting cam 86b of the locking lever control cam member 86 opposes the starting cam contact portion 80b of the charge lever 80, and the three lens support frame drive pins 12a of the lens support frame 12 are located in portions located in the gaps between the cam surfaces of the three focusing cams 118a shown in FIG. 2. This position of the frame 12 is its initial position before the shutter button (not shown) is depressed and before focusing with respect to an object to be photographed is performed.

As shown in FIG. 18, since the engaging projection 82a of the locking lever 82 is separated from the unidirectional locking recess portion 78a of the locking cam 78, the sprocket 74 can freely rotate. Therefore, the rotational force from the bi-directional motor 40 is transmitted to the second output gear 60 so that the gear 60 is rotated in the direction indicated by the arrow G in FIG. 1 to rotate the film wind shaft 44 in the film wind direction via the planet gear 64.

Figure 19:
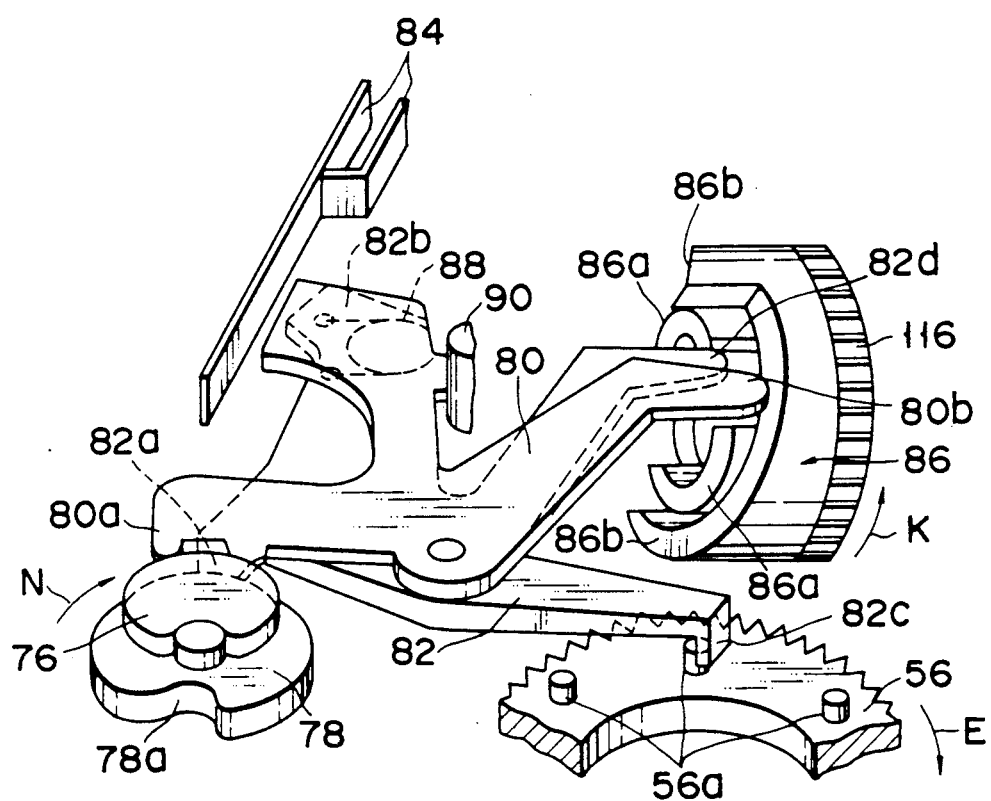
FIG. 19 is a schematic perspective view showing a state of the sprocket, the sprocket control lever mechanism and the cam shown in FIG. 9 during rotation of the sprocket shown in FIG. 9 to feed the next frame of the film.

When the film 36 is moved in the film wind direction, the sprocket 74 rotates in the clockwise direction as indicated by an arrow N in FIGS. 1 and 18. The eccentric return cam 76 rotating together with the sprocket 74 presses the return cam contact portion 80a of the charge lever 80 as shown in FIG. 19 to rotate the lever 80 outward in the radial direction of the return cam 76 against the biasing force of the toggle spring 88. This rotation of the charge lever 80 reverses the biasing force acting direction of the spring 88 (returns the acting direction to its initial acting direction). Therefore, the lever 80 drops the starting cam contact portion 80b to the bottom portion of the cam surface of the starting cam 86b of the locking lever control cam member 86 so as to be rotated in a direction to separate the return cam contact portion 80a from the return cam 76, and is returned to an initial position at which the lever 80 is in contact with the stopper 90 by the biasing force of the spring 88 having the changed acting direction.

The biasing force of the toggle spring 88 having the biasing force acting direction returned to the initial acting direction also biases the locking lever 82 to bring the engaging projection 82a into contact with the outer circumferential surface of the locking cam 78.

One rotation of the sprocket 74 corresponds to feeding of one frame of the film 36. Therefore, when the sprocket 74 rotates once to move the unidirectional locking recess portion 78a of the locking cam 78 to a position corresponding to the engaging projection 82a of the locking lever 82, the locking lever 82 biased by the biasing force of the toggle spring 88 causes the engaging projection 82a to run into the recess portion 78a of the cam 78. As a result, one rotation of the locking cam 78 and therefore the sprocket 74 is stopped to finish feeding of one frame of the film 36. The locking lever 82, the projection 82a of which runs into the recess portion 78a of the cam 78, causes the switch press projection 82b to press and turn off the one-frame switch 84 again as shown in FIG. 9.

Switching from ON to OFF of the one-frame switch 84 increments a film count display performed by a film count display means (not shown) by one and interrupts the power supply to the electromagnet 156.

At the same time, the locking lever 82 moves the engaging projection 82c outward from the locus of the locking pin 56a on the annular first output gear 56 of the first differential gear mechanism 49 so as to release the projection 82c from the engagement with the locking pins 56a.

As described above, when the rotation of the sprocket 74 is stopped and the rotation of the annular first output gear 56 of the first differential gear mechanism 49 is enabled, the same state as shown in FIG. 13 is obtained since the power supply to the electromagnet 156 is interrupted, and the control gear 136 starts clockwise rotation as indicated by the arrow L in FIG. 2 due to the above described difference in the torques required for rotation. The control gear 136 keeps its rotation until the second rotation thereof is finished, and the paired sectors 26 and 28 do not open in this state since no power supply is performed for the electromagnet 156.

In the above embodiment, when a telephoto range/wide-angle range switch arranged in the camera housing (not shown) is depressed, the bi-directional motor 40 rotates the output shaft 46 in an opposite direction of the direction indicated by the arrow C in FIG. 1, i.e., in the counterclockwise direction. Since a one-way clutch 200 is coupled to the annular first output gear 56 of the first differential gear mechanism 49 as shown in FIG. 1 to prevent the first output gear 56 from rotating in the counterclockwise direction which is an opposite direction of the direction indicated by the arrow E in FIG. 1, the rotational force from the output shaft 46 of the motor 40 rotates the second output gear 60 integrally formed with the planet gear support disk 58 in the counterclockwise direction which is an opposite direction of the direction indicated by the arrow G in FIG. 1. This rotation of the second output gear 60 causes the planet gear 64 to revolve in the same direction as the rotation direction of the gear 60, and this revolution of the gear 64 is stopped when the free end portion of the rocking lever 62 abuts against the end face of the horizontally extending end portion of the substantially L-shaped stopper 68. The planet gear 64 meshes with the telephoto range/wide-angle range switching gear 66 to transmit the rotational force from the motor 40 to the gear 66. The telephoto range/wide-angle range switching mechanism shown in FIG. 7 which receives the rotational force from the motor 40 via the planet gear 64 alternately sets the wide-range photographic state shown in FIG. 7 and the telephoto photographic state shown in FIG. 8 each time the eccentric cam drive pin 162 on the upper surface of the last gear of the input gear train 160 circumferentially rotates through substantially 180°.

In the above embodiment, when a film ends during film winding, the sprocket 74 can no longer rotate. In this case, a relationship between the control gear 136, the sector drive control lever 144 and the magnet lever 150 is as shown in FIG. 12, and a mutual relationship between the return cam 76, the locking cam 78, the charge lever 80, the locking lever 82 and the locking lever control cam member 86 is as shown in FIG. 18. As shown in FIG. 18, since the one-frame switch 84 is kept ON, if a CPU in the camera housing (not shown) detects that the switch 84 is not turned off even after a predetermined time period based on a maximum time required to wind one frame of a film elapses, the CPU controls the bi-directional motor 40 to rotate the output shaft 46 in the other direction, i.e., in the counterclockwise direction which is an opposite direction of the direction indicated by the arrow C in FIG. 1. As shown in FIG. 12, the stopper lever drive pin 152 of the magnet lever 150 attracted to the electromagnet 156 presses the upper extending portion of the stopper lever 68, thereby rotating the lever 68 against the biasing force of the biasing means 70 in a direction to move the distal end face of the horizontally extending portion upward from the locus of the free end of the rocking lever 62 shown in FIG. 1. As described above, since the output shaft 46 of the motor 40 rotates in the other direction, i.e., in the counterclockwise direction which is an opposite direction of the direction indicated by the arrow C in FIG. 1, the second output gear 60 rotates in the clockwise direction which is an opposite direction of the direction indicated by the arrow G in FIG. 1. Therefore, the planet gear 64 revolving on the gear 60 in the same direction as the rotational direction of the gear 60 can revolve to a position at which the gear 64 meshes with the film rewind input gear 42b since the free end of the rocking lever 64 does not abut against the stopper lever 68. The planet gear 64 meshed with the film rewind input gear 42b transmits the rotational force from the output shaft 46 of the motor 40 to the gear 42b. In this case, the unidirectional locking recess portion 78a of the locking cam 78 is so formed that the engaging projection 82a of the locking lever 82 does not engage with the recess portion 78a when the locking cam 78 rotates in the opposite direction of the direction indicated by the arrow N in FIG. 18. Therefore, the sprocket 74 integrally formed with the locking cam 78 can freely rotate in the film rewind direction which is an opposite direction of the direction indicated by the arrow N in FIG. 1 until the film 36 is perfectly rewound from the film wind shaft 44 to the patrone shaft 42.

When film rewinding is finished, the bi-directional motor 40 rotates the output shaft 46 in the clockwise direction as indicated by the arrow C in FIG. 1. Upon rotation of the output shaft 46 of the motor 40, the planet gear 64 in the first differential gear mechanism 49 revolves in the same direction as the rotational direction of the output gear 60 in accordance with the counterclockwise rotation of the second output gear 60 indicated by the arrow G in FIG. 1. As a result, when the rocking lever 62 passes under the stopper lever 68, the rotation of the bi-directional motor 40 is stopped and the power supply to the electromagnet 156 is cut off.

In this position, if the output shaft 46 of the motor 40 is rotated in the clockwise direction as indicated by the arrow C in FIG. 1, focusing, exposure control and film winding can be performed. If the output shaft 46 of the motor 40 is rotated in the counterclockwise direction, two optical systems having different focal lengths can be switched to be used in photography.

Additional advantages and modifications will readily occur to those skilled in the art. Therefore, the invention in its broader aspects is not limited to the specific details, and representative devices shown and described. Accordingly, various modifications may be made without departing from the spirit or scope of the general inventive concept as defined by the appended claims and their equivalents.

What is claimed is:

1. A camera comprising:
    a motor;
    a planet gear mechanism having a planet gear to be revolved or rotated by said motor;
    a film wind mechanism provided on a revolution orbit of said planet gear and meshed with and driven by said planet gear upon forward rotation of said motor to perform a film winding operation;
    a film rewind mechanism provided on the revolution orbit of said planet gear and meshed with and driven by said planet gear upon reverse rotation of said motor to perform a film rewinding operation;
    a focal point switching mechanism provide on the revolution orbit of said planet gear from said film wind mechanism to said film rewind mechanism, and meshed with and driven by said planet gear upon reverse rotation of said motor to switch a focal length of a photographic lens of the camera; and
    selecting means for selectively causing said planet gear to mesh with said film rewind mechanism or said focal point switching mechanism upon making said planet gear engage with or disengage from said focal point switching mechanism at the position in which said planet gear can mesh with said focal point switching mechanism when said planet gear is revolved toward said focal point switching mechanism and said film rewind mechanism by reverse rotation of said motor.

2. A camera according to claim 1, wherein said photographic lens comprises two photographic optical systems having different focal lengths, and said focal point switching mechanism includes means for selecting one of said photographic optical systems to form a photographic optical path.

3. A camera according to claim 1, wherein said focal point switching mechanism includes a pivotal mirror means for selecting one of two photographic optical systems in accordance with a pivoting motion of said mirror means.

4. A camera according to claim 1, wherein said focal point switching mechanism includes means for sequentially selecting two focal lengths in accordance with rotation of said planet gear upon reverse rotation of said motor.

5. A camera comprising:
    a differential gear mechanism for receiving a driving force from a motor;
    a control gear means coupled to a first output gear of said differential gear mechanism for executing a sequence of said camera;
    a planet gear mechanism coupled to a second output gear of said differential gear mechanism;
    a locking mechanism for selectively locking rotation of one of said first and second output gears and allowing rotation of the other one;
    a film wind mechanism provided on a revolution orbit of said planet gear and meshed with and driven by said planet gear upon forward rotation of said second output gear to perform a film winding operation;
    a film rewind mechanism provided on said revolution orbit of said planet gear and meshed with and driven by said planet gear upon reverse rotation of said second output gear to perform a film rewinding operation; and
    a focal point switching mechanism provided on the revolution orbit of said planet gear and meshed with and driven by said planet gear upon reverse rotation of said second output gear to switch a focal length of a photographic lens of the camera.

6. A camera according to claim 5, wherein said control gear means includes means for performing a focusing operation and an exposure operation by the rotation and stop thereof.

7. A camera according to claim 5, wherein said first output gear is rotated by rotation of an internal gear, and said second output gear is rotated by rotation of a carrier.

* * * * *